United States Patent
Wong et al.

(10) Patent No.: US 12,487,746 B2
(45) Date of Patent: Dec. 2, 2025

(54) SPECULATIVE REMOTE MEMORY OPERATION TRACKING FOR EFFICIENT MEMORY BARRIER

(71) Applicant: NVIDIA CORPORATION, Santa Clara, CA (US)

(72) Inventors: Raymond Hoi Man Wong, Palo Alto, CA (US); Debajit Bhattacharya, San Jose, CA (US); Michael Allen Parker, San Jose, CA (US); Wishwesh Anil Gandhi, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 85 days.

(21) Appl. No.: 17/989,129

(22) Filed: Nov. 17, 2022

(65) Prior Publication Data
US 2023/0333746 A1    Oct. 19, 2023

Related U.S. Application Data

(60) Provisional application No. 63/330,723, filed on Apr. 13, 2022.

(51) Int. Cl.
*G06F 3/06* (2006.01)

(52) U.S. Cl.
CPC .......... *G06F 3/0613* (2013.01); *G06F 3/0659* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 10,949,265 B2* | 3/2021 | Shveidel | G06F 9/546 |
| 2012/0023304 A1* | 1/2012 | Chan | H04L 43/16 |
| | | | 711/170 |
| 2012/0198214 A1* | 8/2012 | Gadre | G06F 9/3851 |
| | | | 712/225 |
| 2014/0282613 A1* | 9/2014 | Jea | G06F 9/546 |
| | | | 719/314 |
| 2014/0337389 A1* | 11/2014 | Ricketts | G06F 9/4881 |
| | | | 707/803 |

(Continued)

*Primary Examiner* — Jared I Rutz
*Assistant Examiner* — Alexander J Yoon
(74) *Attorney, Agent, or Firm* — Squire Patton Boggs LLP; Sarah Mirza (57) ABSTRACT

Various embodiments include techniques for performing speculative remote memory operation tracking in a multi-processor computing system. Conventionally, transfers of data between processors and other components of a computing system require memory synchronization operations to determine that the data is valid and coherent before the data is transferred from a destination to a requesting source. Existing techniques for performing these memory synchronization operations are increasingly inefficient as the number of components in a computing system increases, particularly for remote memory operations. The disclosed techniques track remote memory operations and speculatively perform these memory synchronization operations. As a result, a given memory synchronization operation is often complete prior to the corresponding remote memory operation arrives at the destination, leading to improved efficiency and performance of remote memory operations in complex computing systems.

20 Claims, 5 Drawing Sheets

(56) References Cited

U.S. PATENT DOCUMENTS

| | | | |
|---|---|---|---|
| 2015/0046678 A1* | 2/2015 | Moloney | G06F 9/5066 |
| | | | 712/29 |
| 2017/0168986 A1* | 6/2017 | Sajeepa | G06F 15/17331 |
| 2018/0024951 A1* | 1/2018 | Edmiston | G06F 9/4881 |
| | | | 718/104 |
| 2018/0365057 A1* | 12/2018 | Nield | G06F 9/3016 |
| 2019/0044853 A1* | 2/2019 | Raghunath | G06F 3/0611 |
| 2022/0253243 A1* | 8/2022 | Kataria | G06F 3/0664 |

* cited by examiner

SPECULATIVE REMOTE MEMORY OPERATION TRACKING FOR EFFICIENT MEMORY BARRIER

CROSS-REFERENCE TO RELATED APPLICATIONS

This application claims priority benefit of the United States Provisional patent application titled, "SPECULATIVE REMOTE MEMORY TRACKING FOR EFFICIENT MEMORY BARRIER," filed on Apr. 13, 2022 and having Ser. No. 63/330,723. The subject matter of this related application is hereby incorporated herein by reference.

BACKGROUND

Field of the Various Embodiments

Various embodiments relate generally to computer system architectures and, more specifically, to speculative remote memory operation tracking for efficient memory barrier.

Description of the Related Art

A computing system generally includes, among other things, one or more processing units, such as central processing units (CPUs) and/or graphics processing units (GPUs), and one or more memory systems. Processing units execute user mode software applications, which submit and launch compute tasks, executing on one or more compute engines included in the processing units. In operation, processing units load data from the one or more memory systems, perform various arithmetic and logical operations on the data, and store data back to the one or more memory systems.

In a complex processor (e.g., a CPU or a GPU), certain tasks involve transferring data between different processing units, cache memories, interconnects, and/or the like by performing memory operations. After issuing a series of memory operations, a processing unit can issue a memory synchronization operation, such as a memory fence or a memory barrier (membar) operation, followed by a flag write or a release operation. The memory synchronization operation is a synchronization mechanism that ensures the series of memory operations are visible to all participating threads, where each thread is an instance of a program, at a given scope, such as system scope or processor scope. This technique for synchronization across threads inside and outside the processor often results in a heavy performance penalty as the size of the processor increases. For example, in GPUs, the number of processing units/cores, the number of last level cache (LLC) slices (e.g., L2 cache slices in some GPUs), the number of internal/external interconnects (e.g., GPU-GPU links, chip-to-chip links, and/or the like) are increasing with every new generation of GPUs. As a result, the handling of synchronization of memory accesses using a memory synchronization operation across all of these components is correspondingly increasing in complexity. In addition, increasing the number of CPU and/or GPUs in the system further increasing the complexity of synchronizing memory operations across all of the CPUs and/or GPUs in a given system. The increase in complexity in synchronizing memory operations within a CPU or GPU and between multiple CPUs and/or GPUs can lead to increased latency during memory operations, leading to reduced memory performance.

As the foregoing illustrates, what is needed in the art are more effective techniques for performing synchronizing memory operations in a computing system.

SUMMARY

Various embodiments of the present disclosure set forth a computer-implemented method for performing speculative remote memory operation tracking in a multiprocessor computing system. The method includes determining that a first requesting source has generated a memory synchronization operation. The method further includes receiving a plurality of acknowledgements responsive to a plurality of memory operations generated by the first requesting source. The method further includes coalescing the plurality of acknowledgements into a coalesced acknowledgement. The method further includes transmitting the coalesced acknowledgement to the first requesting source.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques, memory synchronization operations are performed speculatively in the background. As the number of sources and destinations of memory operations increases with the size of the processor, the amount of time to resolve memory synchronization operations also increases. By performing memory synchronization operations speculatively in the background, these memory synchronization operations are often already completed upon arrival at the source. Tracking coalesced acknowledgments via a centralized acknowledgement tracking engine and/or via multiple distributed acknowledgement tracking engine, in order to manage synchronization leads to improved connectivity and reduced bandwidth requirements relative to prior synchronization approaches. As a result, memory synchronization operations are completed rapidly, even when the number of requesting sources and/or destinations in a processor is large. As a result, the performance of memory synchronization operations is improved, even for large, complex processors, particular for remote memory operations. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
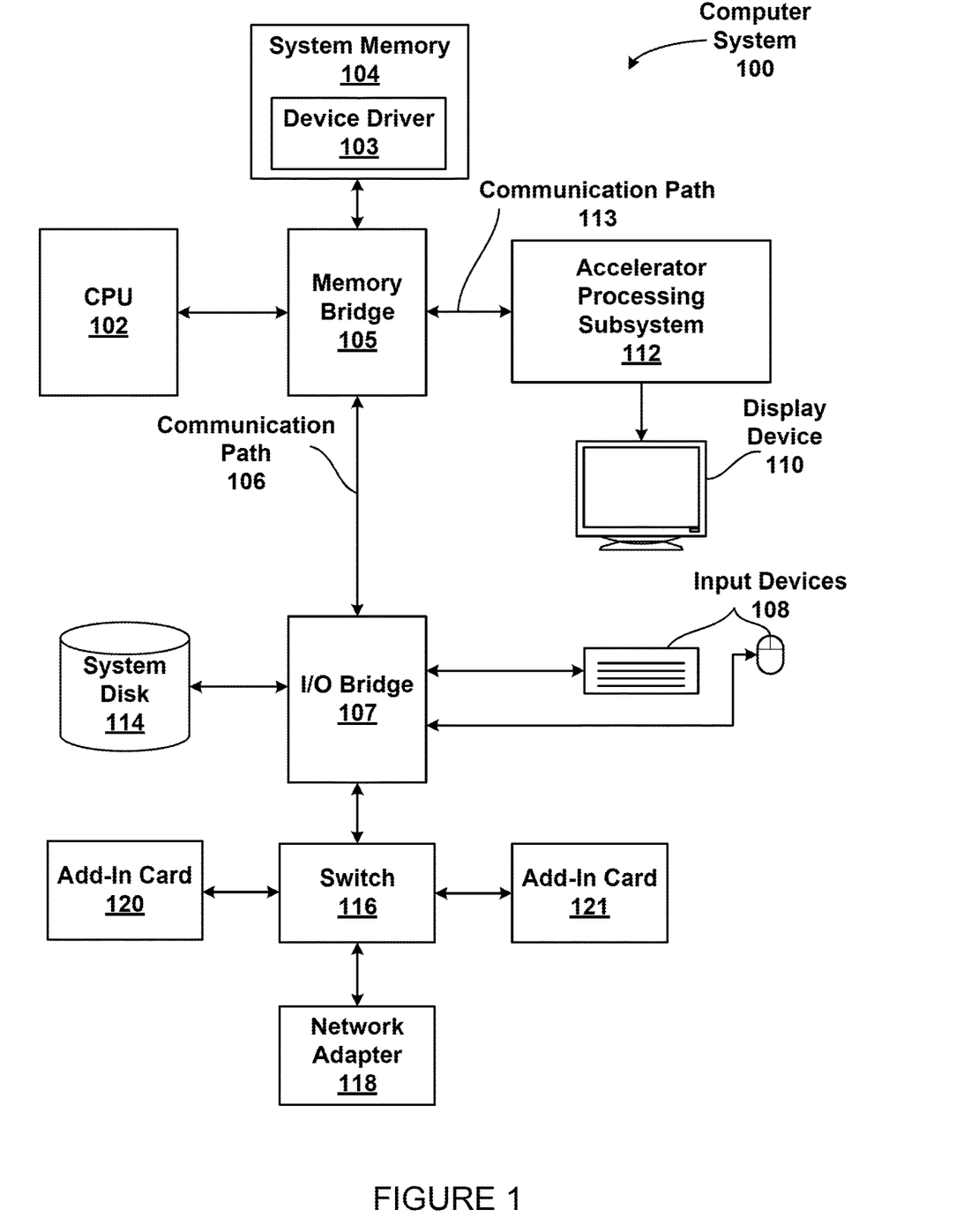
FIG. 1 is a block diagram of a computer system configured to implement one or more aspects of the various embodiments.

FIG. 1 is a block diagram of a computer system 100 configured to implement one or more aspects of the various embodiments. As shown, computer system 100 includes, without limitation, a central processing unit (CPU) 102 and a system memory 104 coupled to an accelerator processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computer system 100 to authorized users and deny access of computer system 100 to unauthorized users. Switch 116 is configured to provide connections between I/O bridge 107 and other components of the computer system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and accelerator processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, Peripheral Component Interconnect Express (PCIe), HyperTransport, or any other bus or point-to-point communication protocol known in the art.

In some embodiments, accelerator processing subsystem 112 comprises a graphics subsystem that delivers pixels to a display device 110 that may be any conventional cathode ray tube, liquid crystal display, light-emitting diode display, or the like. In such embodiments, the accelerator processing subsystem 112 incorporates circuitry optimized for graphics and video processing, including, for example, video output circuitry. As described in greater detail below in FIG. 2, such circuitry may be incorporated across one or more accelerators included within accelerator processing subsystem 112. An accelerator includes any one or more processing units that can execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, accelerator processing subsystem 112 includes two processors, referred to herein as a primary processor (normally a CPU) and a secondary processor. Typically, the primary processor is a CPU and the secondary processor is a GPU. Additionally or alternatively, each of the primary processor and the secondary processor may be any one or more of the types of accelerators disclosed herein, in any technically feasible combination. The secondary processor receives secure commands from the primary processor via a communication path that is not secured. The secondary processor accesses a memory and/or other storage system, such as such as system memory 104, Compute eXpress Link (CXL) memory expanders, memory managed disk storage, on-chip memory, and/or the like. The secondary processor accesses this memory and/or other storage system across an insecure connection. The primary processor and the secondary processor may communicate with one another via a GPU-to-GPU communications channel, such as Nvidia Link (NVLink). Further, the primary processor and the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the accelerator processing subsystem 112 incorporates circuitry optimized for general purpose and/or compute processing. Again, such circuitry may be incorporated across one or more accelerators included within accelerator processing subsystem 112 that are configured to perform such general purpose and/or compute operations. In yet other embodiments, the one or more accelerators included within accelerator processing subsystem 112 may be configured to perform graphics processing, general purpose processing, and compute processing operations. System memory 104 includes at least one device driver 103 configured to manage the processing operations of the one or more accelerators within accelerator processing subsystem 112.

In various embodiments, accelerator processing subsystem 112 may be integrated with one or more other the other elements of FIG. 1 to form a single system. For example, accelerator processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of accelerator processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, accelerator processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
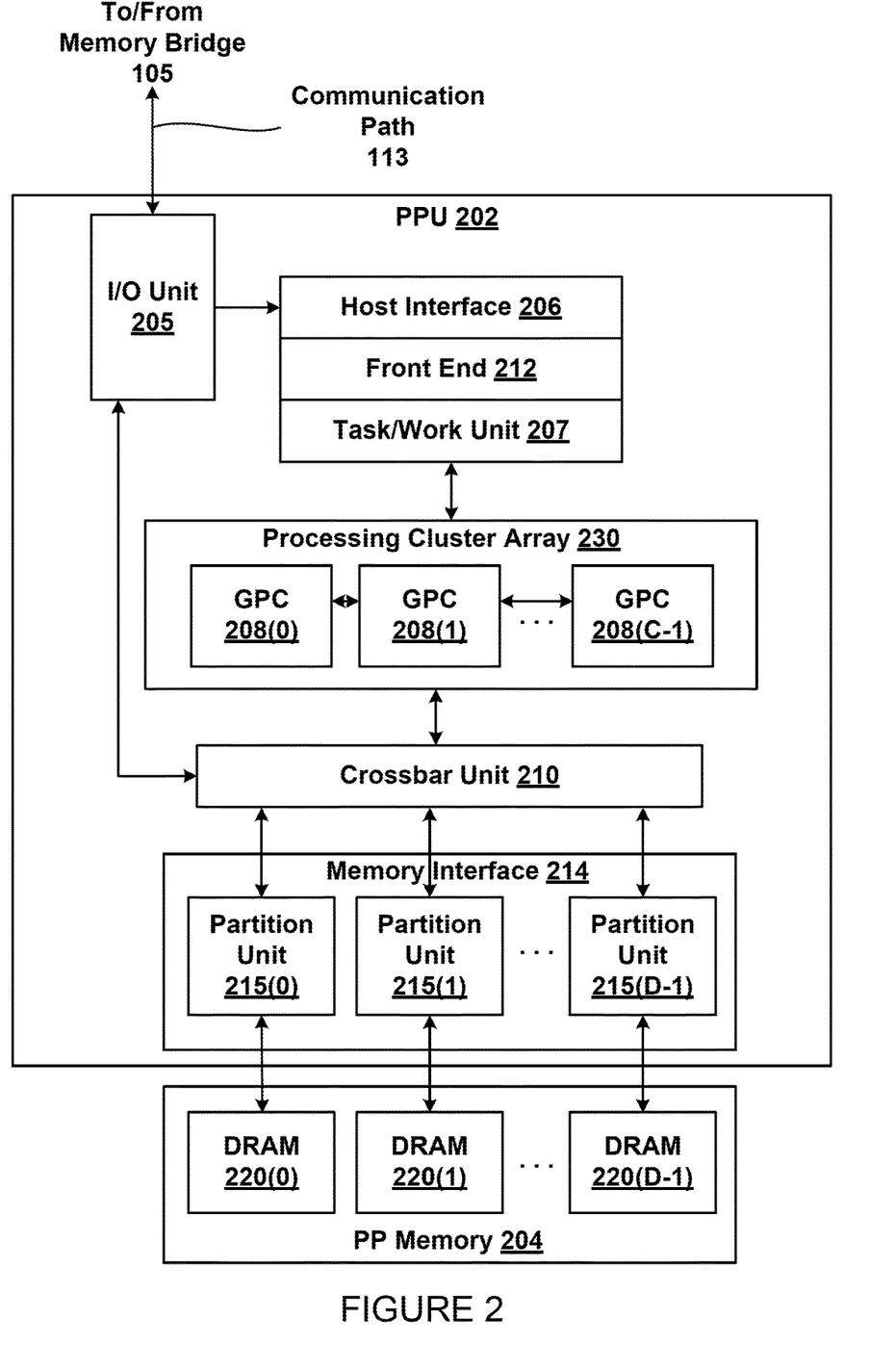
FIG. 2 is a block diagram of a parallel processing unit (PPU) included in the accelerator processing subsystem of FIG. 1, according to various embodiments.

FIG. 2 is a block diagram of a parallel processing unit (PPU) 202 included in the accelerator processing subsystem 112 of FIG. 1, according to various embodiments. Although FIG. 2 depicts one PPU 202, as indicated above, accelerator processing subsystem 112 may include any number of PPUs 202. Further, the PPU 202 of FIG. 2 is one example of an accelerator included in accelerator processing subsystem 112 of FIG. 1. Alternative accelerators include, without limitation, CPUs, GPUs, DMA units, IPUs, NPUs, TPUs, NNPs, DPUs, VPUs, ASICs, FPGAs, and/or the like. The techniques disclosed in FIGS. 2-4 with respect to PPU 202 apply equally to any type of accelerator(s) included within accelerator processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or accelerators other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, accelerator processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within accelerator processing subsystem 112, or another accelerator processing subsystem 112 within computer system 100.

As noted above, any number of PPUs 202 may be included in an accelerator processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
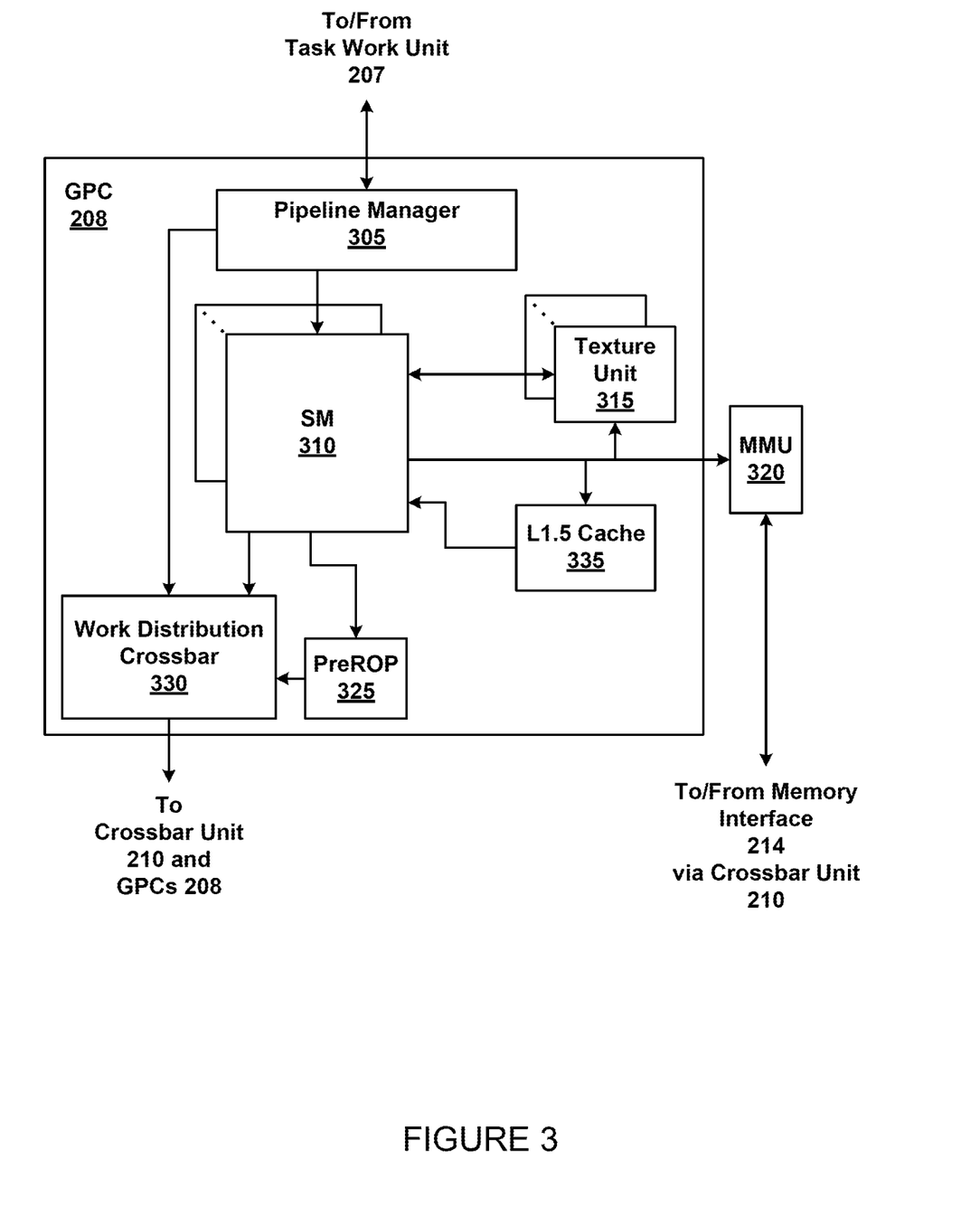
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Speculative Remote Memory Tracking

As described herein, in GPUs, the number of processing units/cores (such as SMs 310), the number of last level cache (LLC) slices, the number of internal/external interconnects (e.g., GPU-GPU links, chip-to-chip links, and/or the like) are increasing with every new generation of GPUs. As used herein, the last level cache is the cache memory farthest away from the processor and nearest to the backing store, such as parallel processing memory 204, or system memory 104. In a system that has a level 1 cache memory, a level 1.5 cache memory, and a level 2 cache memory, the last level cache is the level 2 cache memory. The handling of synchronization of memory accesses using a memory synchronization operation, such as a memory fence or memory barrier, across all of these components is correspondingly increasing in complexity as the number of sources for memory operations increases and the number of destinations for memory operations likewise increases. In addition, increasing the number of CPU and/or GPUs in the system further increasing the complexity of synchronizing local memory operations and remote memory operations across all of the CPUs and/or GPUs in a given system.

In some examples, the last level cache processes two types of remote traffic for memory operations. A first type of remote traffic is LLC-reflected remote traffic. With this type of remote traffic, the last level cache in a conventional parallel processing subsystem caches data for various types of global memory apertures, including memory apertures for the local memory (such as parallel processing memory 204) and memory apertures for remote memory (such as system memory 104, peer memory in the form of parallel processing memory 204 on a remote PPU 202, and/or the like). Memory operation requests targeted to memory that are cached in the last level cache of a local GPC 208 first arrive at a memory slice of the last level cache. The memory operation requests are reflected toward one of the remote-memory endpoints (such as the hubs) on the GPC 208. Performing a memory synchronization operation at the last level cache generally involves performing additional operations to push each reflected memory operation request to an appropriate scope of visibility. These additional operations are performed at each memory slice of the last level cache and each hub that is within the appropriate scope of visibility, even if the memory operation request is not relevant to a particular memory slice or hub. As a result, these additional operations become increasingly expensive and inefficient as processors continue to scale up and the number of components at each scope of visibility increases, leading to increased latency.

A second type of remote traffic is LLC-bypass remote traffic. With this type of remote traffic, memory operation requests targeted to a remote memory that are not cached in the last level cache in a conventional parallel processing subsystem do not pass through the last level cache. Instead, those memory operation requests, referred to herein as LLC-bypass requests, are transmitted directly to the respective hubs from the requesting source. With LLC-bypass requests, processing of the memory synchronization operation does not involve the last level cache and instead are completed by the requesting source and the hubs. However, this approach adds design complexity to enable the requesting source to process memory operation requests directly rather than processing local and remote memory operation requests via the last level cache. Further, this mechanism has similar performance issues as described for LLC-reflected remote traffic as processors scale up.

In conventional processors, memory synchronization operations are processed upon arrival when the memory synchronization operation is initiated. In other words, the hubs and MMUs, such as MMU 320, in a processor begin to process a memory synchronization operation only when a requesting source, such as an SM 310 and/or other processing core/unit) issues a memory synchronization operation. Depending on the local and/or remote memory traffic issued by that requesting source prior to that memory synchronization operation, the memory synchronization operation can result in a few or many additional operations transmitted to hubs, memory slices in the last level cache, and/or to other units in order to complete the memory synchronization operation. Such memory operations can be very expensive and time consuming, particularly in the case of remote memory operations. These memory operations are especially expensive for multiple software kernels executing on the processor that direct traffic to multiple remote memory apertures.

To address the issues set forth above, various embodiments include a speculative remote memory tracking mechanism that includes one or more acknowledgement tracking engines placed in centralized locations in the processor, such as a PPU 202, a CPU 102, and/or the like. With this mechanism, the processor speculatively prepares for a potential memory synchronization operation in advance. As a result, when a memory synchronization operation actually arrives from a requesting source, the processing of that memory synchronization operation has likely already completed in the background. Therefore, memory synchronization operation is completed, or acknowledged, very rapidly. The acknowledgement tracking engine maintains a count of outstanding remote memory operations from various requesting sources in the background. With this speculative mechanism, the hubs communicate to a centrally located acknowledgement tracking engine on the processor which, in turn, communicates with the requesting sources on the processor. In this manner, destinations, such as hubs, and/or the like, on the processor remain up to date regarding the status of prior remote memory operations from their respective requesting sources, such as, memory slices of the last level cache, MMUs 320, and/or the like. When a subsequent memory synchronization operation later arrives at the requesting source, the requesting source does not need to perform any additional operations. Instead, the destination services the memory synchronization operation in a fast and efficient manner, relative to conventional "upon-arrival" approaches.

Figure 4:
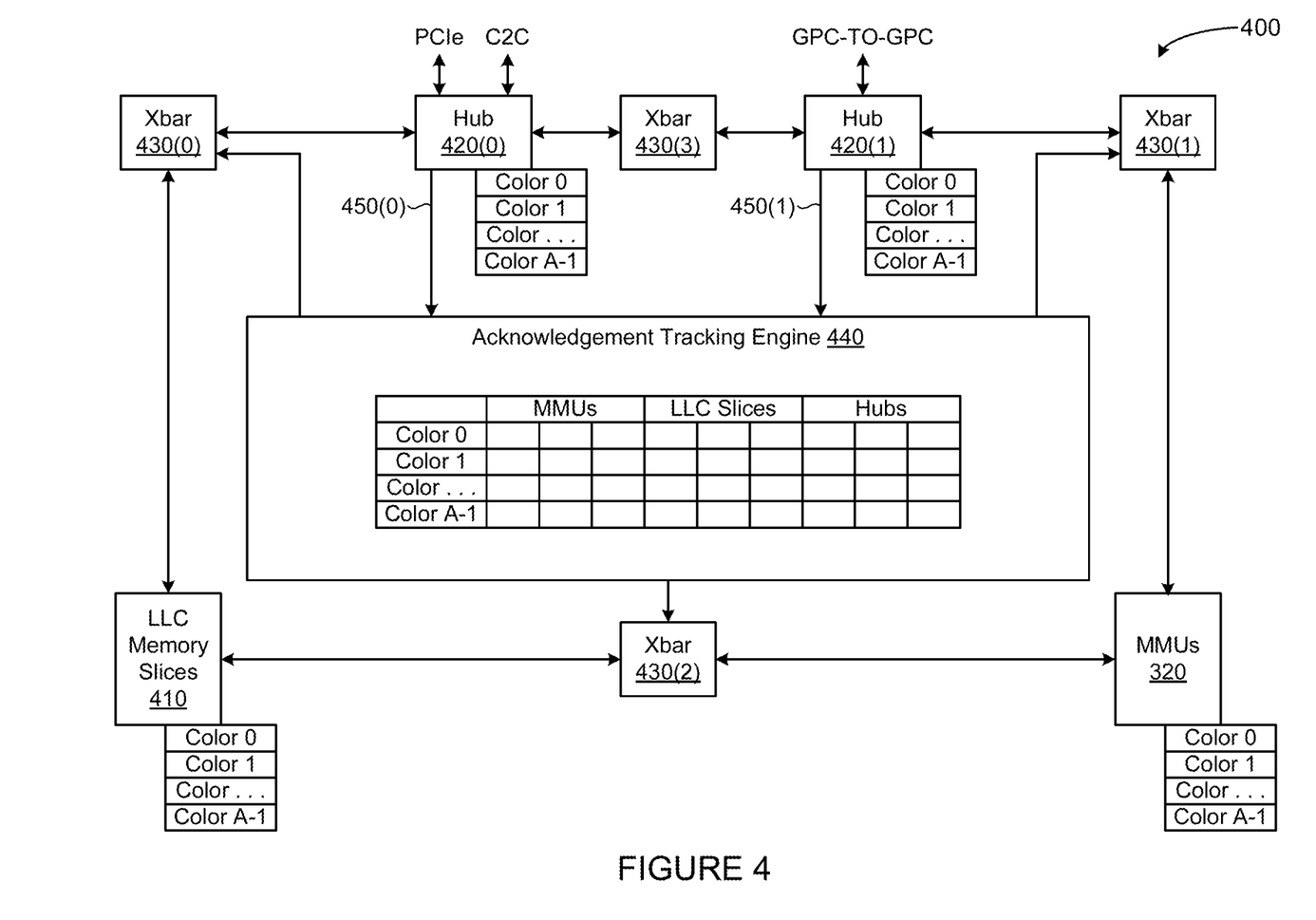
FIG. 4 is a block diagram of an acknowledgement tracking system for the accelerator processing subsystem of FIG. 1, according to various embodiments.

FIG. 4 is a block diagram of an acknowledgement tracking system 400 for the accelerator processing subsystem of FIG. 1, according to various embodiments. As shown, acknowledgement tracking system 400 includes, without limitation, last level cache (LLC) memory slices 410, MMUs 320, hubs 420(0)-420(1), crossbars (XBARs) 430 (0)-430(3), and an acknowledgement tracking engine 440.

Each last level cache memory slice 410 corresponds to a different portion of the last level cache and is configured to access a corresponding subset of locations within DRAM 220. GPCs 208 write data to and read data from one or more last level cache memory slices 410. In some examples, each GPC 208 is allocated a separate set of last level cache memory slices 410 derived from the last level cache and any given GPC 208 can perform write/read operations with the corresponding set of last level cache memory slices 410.

Each MMU 320 services one or more SMs 310 included in a given GPC 208. Each GPC 208 may have an associated MMU 320 that is configured to map virtual addresses into physical addresses for the SMs 310 included in the GPC 208. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

Hubs 420 serve as an interface between local requesting sources, such as last level cache memory slices 410 and MMUs 320, and remote destinations, such as memory located on a remote CPU 102 or PPU 202. In that regard, hubs 420 effectively act as a local destination for the local requesting sources. As shown, hub 420(0) serves as an interface between local requesting sources and remote destinations connected via a PCIe communications channel. Further, hub 420(0) serves as an interface between local requesting sources and remote destinations connected via a chip-to-chip (C2C) communications channel, such as a CPU-to-CPU communications channel, an SoC-to-SoC communications channel, and/or the like. Such a communications channel is also referred to as an interprocessor communications channel. Hub 420(1) serves as an interface between local requesting sources and remote destinations connected via a GPU-to-GPU communications channel, such as NVLink, a link between two or more GPCs 208, and/or the like.

Crossbars 430 are configured to route memory operations among the last level cache memory slices 410, MMUs 320, hubs 420 and acknowledgement tracking engine 440 for further processing. Crossbar 430(0) routes memory operations between last level cache memory slices 410 and hub 420(0) to route remote memory operations between last level cache memory slices 410 and destinations accessible via the PCIe interface and/or the chip-to-chip interface. Similarly, crossbar 430(1) routes memory operations between MMUs 320 and hub 420(1) to route remote memory operations between MMUs 320 and destinations accessible via the GPU-to-GPU communications channel. Crossbar 430(2) routes memory operations between last level cache memory slices 410 and MMUs 320 to transfer data between the last level cache memory slices 410 and memory systems accessible to MMUs 320.

Multiple crossbars 430 work in conjunction with one another to generate additional routing options. In that regard, crossbars 430(0) and 430(3) work in conjunction to route memory operations between last level cache memory slices 410 and hub 420(1) to route remote memory operations between last level cache memory slices 410 and destinations accessible via the GPU-to-GPU communications channel. Similarly, crossbars 430(1) and 430(3) work in conjunction to route memory operations between MMUs 320 and hub 420(0) to route remote memory operations between MMUs 320 and destinations accessible via the PCIe interface and/or the chip-to-chip interface.

In operation, acknowledgement tracking engine 440 maintains status of remote memory operations in process in acknowledgement tracking system 400. Acknowledgement tracking engine 440 exchanges data regarding these remote memory operations with hubs 420(0) and 420(1). Acknowledgement tracking engine 440 communicates with hub 420(0) via a dedicated interface 450(0). Likewise, acknowledgement tracking engine 440 communicates with hub 420(1) via a dedicated interface 450(1). Acknowledgement tracking engine 440 generates acknowledgements for groups of remote memory operations and transmits those acknowledgements to the requesting sources, such as last level cache memory slices 410 and MMUs 320, via crossbars 430(0)-430(2).

Acknowledgement tracking system 400 employs acknowledgement tracking engine 440 to unify and simplify memory synchronization operations for both the LLC-reflected remote traffic and the LLC-bypass traffic described herein. Acknowledgement tracking engine 440 includes counters for the possible requesting sources that can issue remote memory operations. For example, a last level cache memory slice 410 can be a requesting source because last level cache memory slice 410 can generate LLC-reflected remote memory operations. Similarly, a MMU 320 can be a requesting source on behalf of the components serviced by that MMU 320, such as one or more SMs 310. Although hubs 420 are often destinations, hubs 420 can also be requesting source on behalf of the components serviced by that hub 420, such as one or more direct memory access engines, one or more copy engines, and/or the like.

Acknowledgement tracking engine 440 maintains a counter list for each possible requesting source. As shown in FIG. 4, each possible requesting source has a corresponding column in the database included in acknowledgement tracking engine 440, or, more simply, the tracking database. In that regard, the database included in acknowledgement tracking engine 440 has a column for each MMU 320, each last level cache memory slice 410, and each hub 420 included in acknowledgement tracking system 400. In some examples, the database included in acknowledgement tracking engine 440 could have hundreds of columns, where the corresponding PPU 202 includes hundreds of possible requesting sources. In some examples, in order to support the techniques described herein, each counter may be in the range of 10-bits to 16-bits wide. However, each counter can include any technically feasible number of bits. Therefore, even with hundreds of possible requesting sources, the amount of storage needed for the database included in acknowledgement tracking engine 440 is relatively minimal. Further, the database includes A rows, labeled color 0 through color A-1, where each row tracks different memory synchronization operations for the various requesting sources.

Acknowledgement tracking engine 440 coalesces acknowledgements for multiple remote memory operations in groups, where the groups are referred to herein as colors. In general, a group or color represents a set of memory operations that are related, such as the set of memory operations that exist between a pair of successive memory synchronization operations. A requesting source, such as a last level cache memory slice 410 or an MMU 320, assigns a group identifier, or color, to a remote memory operation and increases a counter within the requesting source corresponding to the color when the requesting source generates and transmits the remote memory operation. The number of colors, or counters, included in a particular requesting source is equal to the maximum number of outstanding or in-flight memory synchronization operations that the particular requesting source is able to support at any given time. The remote memory operation passes through to a destination hub 420 via one or more crossbars 430. The hub 420 transmits a remote access notification message to acknowledgement tracking engine 440 via dedicated interface 450. This remote access notification message includes information about the remote memory operation, including the identification of the requesting source, the color assigned to the remote memory operation, and/or the like. Acknowledgement tracking engine 440 increments a counter corresponding to the requesting source and the color of the remote memory operation.

When a threshold number of such remote memory operations have been counted for a particular requesting source and color combination, then acknowledgement tracking engine 440 transmits a single coalesced acknowledgement that acknowledges all of the remote memory operations represented by the count. In some examples, the threshold number of remote memory operations to coalesce is programmable. Acknowledgement tracking engine 440 also tracks the duration of time since transmitting the most recent coalesced acknowledgement. Acknowledgement tracking engine 440 transmits the coalesced acknowledgement after the passage of a threshold duration of time since the most recent coalesced acknowledgement, even if the threshold number of remote memory operations has not yet been reached. In some examples, the threshold duration of time is programmable. Acknowledgement tracking engine 440 transmits the coalesced acknowledgement to the requesting source via one or more crossbars 430.

In response, the requesting source decrements the local counter for the corresponding color based on the coalesced count included in the acknowledgement. When this local counter reaches a value of zero, then the requesting source acknowledges that the memory synchronization operation of the same color is satisfied without having to perform additional operations. This color-based approach thereby reduces the complexity and latency of memory synchronization operations relative to prior conventional approaches, such as the "upon arrival" technique described herein.

In some examples, the requesting source acknowledges that the memory synchronization operation of the same color is satisfied when the local counter reaches a reference value that may or may not be zero. In such examples, the reference count may be the value of the local counter at the completion of a prior memory synchronization operation. As a result, the local counter does not need to be reset to zero at the end of each memory synchronization operation.

In some examples, the requesting source acknowledges that the memory synchronization operation of the same color is satisfied when a first local counter reaches a value stored in a second local counter. In such examples, the first local counter counts acknowledgements for a current memory synchronization operation while the second local counter counted acknowledgements for a prior memory synchronization operation. At the end of the current memory synchronization operation, the second local counter counts acknowledgements for a subsequent memory synchronization operation while the first local counter stores the value at the completion of the current memory synchronization operation. As a result, completion of a memory synchronization operation is determined when the value stored in the first local counter is equal to the value stored in the second local counter. The local counters do not need to be reset to zero or some other reference value at the end of each memory synchronization operation.

As shown in FIG. 4, a single, centralized acknowledgement tracking engine 440 maintains status of remote memory operations in process for all requesting sources in acknowledgement tracking system 400. A single, centralized acknowledgement tracking engine 440 maintains the latest status of remote memory operations on the processor. Therefore, when executing a memory synchronization operation, the requesting source does not need to perform additional operations on hubs 420 for remote memory operation synchronization. Alternatively, acknowledgement tracking system 400 can include multiple, distributed acknowledgement tracking engines 440. In some examples, if acknowledgement tracking system 400 includes N acknowledgement tracking engines 440, then each acknowledgement tracking engine 440 replicates the entire set of counters, maintains counters for a different 1/N subset of the counters, or performs a combination of these two approaches. One of the acknowledgement tracking engines 440 can be designated as the primary acknowledgement tracking engine 440, where the primary acknowledgement tracking engine 440 coordinates among the multiple acknowledgement tracking engines 440. Alternatively, a requesting source of a memory synchronization operation can coordinate among the multiple acknowledgement tracking engines 440 for that memory synchronization operation.

If each acknowledgement tracking engine 440 replicates the entire set of counters, then each acknowledgement tracking engine 440 receives the remote memory operation acknowledgements from a subset of the remote-memory endpoints, such as hubs 420. Each acknowledgement tracking engine 440 coalesces those acknowledgements before returning the acknowledgements to the requesting source. This technique manages multiple remote-memory ordering-points and allows each acknowledgement tracking engine 440 to consume only the bandwidth to receive updates from a subset of the remote-memory endpoints, typically those remote-memory endpoints that are physically near the corresponding acknowledgement tracking engine 440.

If each acknowledgement tracking engine 440 maintains a subset of the set of counters, then the remote memory operations for a particular requesting source is maintained in a single acknowledgement tracking engine 440. As a result, any particular acknowledgement tracking engine 440 coalesces acknowledgements for a subset of the requesting sources. A hybrid approach of these two techniques can be used to provide a balance between maintaining a full replica of the counters and maintain a subset of the counters. Such a hybrid approach can be advantageous where a processor has a large number of requesting source as well as a large number of destinations. In some examples, acknowledgement tracking engines 440 can be organized in a multi-tiered hierarchy, where a top-level acknowledgement tracking engine 440 in a first tier communicates with multiple acknowledgement tracking engines 440 in a second tier. One or more of the acknowledgement tracking engines 440 in the second tier, in turn, communicate with multiple acknowledgement tracking engines 440 in a third tier, and so on.

In some examples, a processor, such as a CPU 102 or a PPU 202, employs a mixed approach where certain requesting sources employ the acknowledgement tracking techniques disclosed herein, while other requesting sources employ conventional approaches, such as LLC-reflected remote traffic techniques and/or LLC-bypass remote traffic techniques. In some examples, a particular requesting source/color combination represents multiple requesting sources. In one example, a last level cache memory slice 410 additionally tracks memory operations for one or more SMs 310 that use the last level cache memory slice 410 for temporary storage. In another example, an MMU 320 additionally tracks memory operations for one or more SMs 310, and threads executing on the one or more SMs 310, that use the MMU 320 for address translation services.

Figure 5:
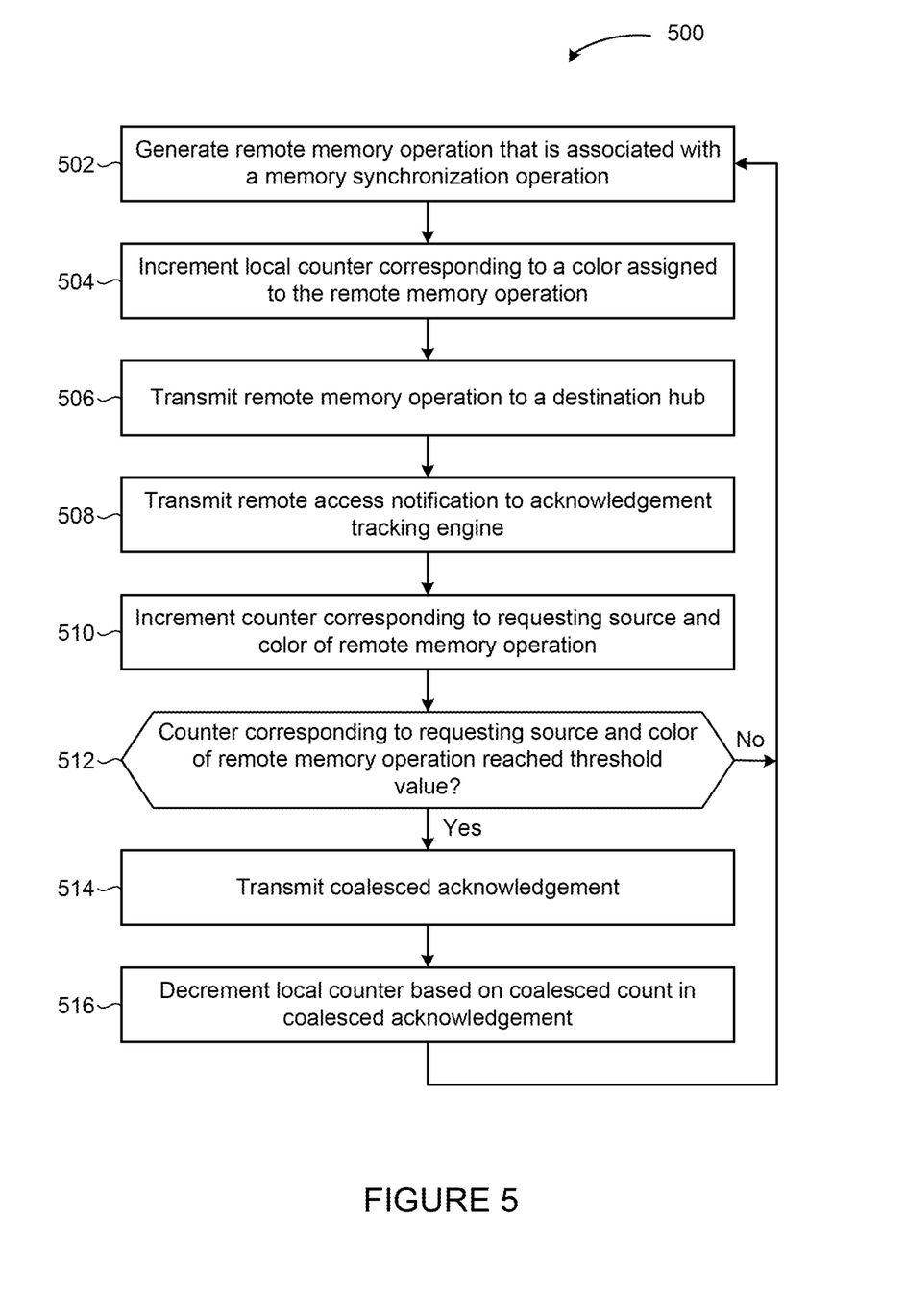
FIG. 5 is a flow diagram of method steps for performing speculative remote memory operation tracking in a multi-processor computing system with the acknowledgement tracking system 400 of FIG. 4, according to various embodiments.

FIG. 5 is a flow diagram of method steps for performing speculative remote memory operation tracking in a multi-processor computing system with the acknowledgement tracking system 400 of FIG. 4, according to various embodiments. Additionally or alternatively, the method steps can be performed by one or more alternative accelerators including, without limitation, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-4, persons of ordinary skill in the art will understand that any system configured to perform the method steps, in any order, is within the scope of the present disclosure.

As shown, a method 500 begins at step 502, where a requesting source generates a remote memory operation that is associated with a memory synchronization operation. One type of requesting source is a last level cache memory slice 410 that generates LLC-reflected remote memory operations. Another type of requesting source is a MMU 320 that can be a requesting source on behalf of the components serviced by that MMU 320, such as one or more SMs 310. Yet another type of requesting source is a hub 420 that can be a requesting source on behalf of the components serviced by that hub 420, such as one or more direct memory access engines, one or more copy engines, and/or the like.

At step 504, the requesting source increments a local counter corresponding to a color assigned to the remote memory operation. The requesting source assigns a group identifier, or color, to a remote memory operation and increases a counter within the requesting source corresponding to the color when the requesting source generates and transmits the remote memory operation. The maximum value for this counter depends on the maximum number of outstanding or in-flight memory synchronization operations that the requesting source is able to support.

At step 506, the requesting source transmits the remote memory operation to a destination hub 420 via one or more crossbars 430. Crossbars 430 route remote memory operations among requesting sources and destinations, including last level cache memory slices 410, MMUs 320, and hubs 420. Hubs 420 serves as an interface between local requesting sources and remote destinations connected via a PCIe communications channel, a chip-to-chip communications channel, a GPC-to-GPC communications channel, and/or the like.

At step 508, the hub 420 transmits a remote access notification message to acknowledgement tracking engine 440 via dedicated interface 450. This remote access notification message includes information about the remote memory operation, including the identification of the requesting source, the color assigned to the remote memory operation, and/or the like. Acknowledgement tracking engine 440 receives an acknowledgement in the form of the remote access notification message responsive to the remote memory operation. Acknowledgement tracking engine 440 further receives additional acknowledgements responsive to additional memory operations generated by the requesting source.

At step 510, acknowledgement tracking engine 440 increments a counter corresponding to the requesting source and the color of the remote memory operation. Each possible requesting source has a corresponding column in the database included in at least one acknowledgement tracking engine 440. Acknowledgement tracking engine 440 coalesces multiple remote memory operations for each combination of requesting source and color.

At step 512, acknowledgement tracking engine 440 determines whether the counter corresponding to the requesting source and the color of the remote memory operation has reached a threshold value. The threshold value represents the maximum number of remote memory operations that can be coalesced for the particular combination of requesting source and color. If the counter corresponding to the requesting source and the color of the remote memory operation has not reached the threshold value, then the method 500 returns to step 502, described above, to process additional remote memory operations.

If, however, the counter corresponding to the requesting source and the color of the remote memory operation has reached a threshold value, then the method 500 proceeds to step 514, where acknowledgement tracking engine 440 transmits a single coalesced acknowledgement that acknowledges all of the remote memory operations represented by the count. In some examples, the threshold number of remote memory operations to coalesce is programmable. In so doing, acknowledgement tracking engine 440 coalesces acknowledgements received from the requesting source and/or acknowledgements received from one or more other requesting sources into a coalesced acknowledgement. Subsequent to coalescing these acknowledgments, acknowledgement tracking engine 440 receives a memory synchronization operation corresponding to a set of memory operations, such as a set of memory operations that includes the remote memory operation of step 502. Responsive to receiving the memory synchronization operation, acknowledgement tracking engine 440 transmits the coalesced acknowledgement to the requesting source via one or more crossbars 430.

At step 516, the requesting source decrements the local counter for the corresponding color based on the coalesced count included in the coalesced acknowledgement. When this local counter reaches a value of zero, then the requesting source acknowledges that the memory synchronization operation of the same color is satisfied without having to perform additional operations.

In some examples, the requesting source acknowledges that the memory synchronization operation of the same color is satisfied when the local counter reaches a reference value that may or may not be zero. In such examples, the reference count may be the value of the local counter at the completion of a prior memory synchronization operation. As a result, the local counter does not need to be reset to zero at the end of each memory synchronization operation.

In some examples, the requesting source acknowledges that the memory synchronization operation of the same color is satisfied when a first local counter reaches a value stored in a second local counter. In such examples, the first local counter counts acknowledgements for a current memory synchronization operation while the second local counter counted acknowledgements for a prior memory synchronization operation. At the end of the current memory synchronization operation, the second local counter counts acknowledgements for a subsequent memory synchronization operation while the first local counter stores the value at the completion of the current memory synchronization operation. As a result, completion of a memory synchronization operation is determined when the value stored in the first local counter is equal to the value stored in the second local counter. The local counters do not need to be reset to zero or some other reference value at the end of each memory synchronization operation. The method 500 then returns to step 502, described above, to process additional remote memory operations.

In some examples, steps 502 and 516 are performed concurrently. For example, when processing a single request for a memory operation, a requesting source generates a remote memory operation at step 502. The remote memory operation progresses sequentially through steps 504-510. At step 512, because a single remote memory operation is in progress, the method proceeds sequentially to steps 514 and 516. By contrast, when processing multiple requests, for remote memory operations, one or more requesting sources generate multiple requests for remote memory operations. The remote memory operations are processed concurrently, where each of the remote memory operations can be at different phases of method 500. In one particular example, a first remote memory operation can be progressing through steps 512-516 concurrently with a second remote memory operation that is newly requested and is progressing through method 500 starting at step 502.

In sum, various embodiments include a speculative remote memory tracking mechanism that includes one or more acknowledgement tracking engines placed in centralized locations in the processor, such as a PPU, a CPU, and/or the like. With this mechanism, the processor speculatively prepares for a potential memory synchronization operation in advance. As a result, when a memory synchronization operation actually arrives from a requesting source, the processing of that memory synchronization operation has likely already completed in the background. Therefore, memory synchronization operation is completed, or acknowledged, very rapidly. The acknowledgement tracking engine maintains a count of outstanding remote memory operations from various requesting sources in the background. With this speculative mechanism, the hubs communicate to a centrally located acknowledgement tracking engine on the processor which, in turn, communicates with the requesting sources on the processor. In this manner, destinations, such as hubs, and/or the like, on the processor remain up to date regarding the status of prior remote memory operations from their respective requesting sources, such as memory slices of the last level cache, MMUs, and/or the like. When a subsequent memory synchronization operation later arrives at the requesting source, the requesting source does not need to perform any additional operations. Instead, the destination services the memory synchronization operation in a fast and efficient manner, relative to conventional "upon-arrival" approaches.

At least one technical advantage of the disclosed techniques relative to the prior art is that, with the disclosed techniques, memory synchronization operations are performed speculatively in the background. As the number of sources and destinations of memory operations increases with the size of the processor, the amount of time to resolve memory synchronization operations also increases. By performing memory synchronization operations speculatively in the background, these memory synchronization operations are often already completed upon arrival at the source. Tracking coalesced acknowledgments via a centralized acknowledgement tracking engine and/or via multiple distributed acknowledgement tracking engine, in order to manage synchronization leads to improved connectivity and reduced bandwidth requirements relative to prior synchronization approaches. As a result, memory synchronization operations are completed rapidly, even when the number of requesting sources and/or destinations in a processor is large. As a result, the performance of memory synchronization operations is improved, even for large, complex processors, particular for remote memory operations. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing memory operation tracking in a multiprocessor computing system, the method comprising: receiving a first plurality of acknowledgements responsive to a first plurality of memory operations generated subsequent to a first memory synchronization operation and prior to a second memory synchronization operation by a first requesting source included in a plurality of requesting sources, wherein the first memory synchronization operation and each memory operation included in the first plurality of memory operations are identified by a first group identifier; coalescing the first plurality of acknowledgements with a second plurality of acknowledgments responsive to a second plurality of memory operations generated subsequent to the first memory synchronization operation and prior to the second memory synchronization operation by the first requesting source into a coalesced acknowledgement, wherein each memory operation included in the second plurality of memory operations is identified by the first group identifier; subsequent to coalescing the first plurality of acknowledgements with the second plurality of acknowledgments, receiving the second memory synchronization operation corresponding to at least one of the first plurality of memory operations or the second plurality of memory operations; determining that a sum of the memory operations included in the first plurality of memory operations and the memory operations included in the second plurality of memory operations exceeds a threshold number for the first requesting source and the first group identifier; and responsive to determining that the sum of the memory operations included in the first plurality of memory operations and the memory operations included in the second plurality of memory operations exceeds the threshold number for the first requesting source and the first group identifier, transmitting the coalesced acknowledgement to the first requesting source.

2. The computer-implemented method of claim 1, wherein the coalesced acknowledgement includes a count of the first plurality of acknowledgements.

3. The computer-implemented method of claim 2, wherein the first requesting source includes a first local counter associated with the second memory synchronization operation, and wherein the first requesting source decrements the first local counter by the count of the first plurality of acknowledgements.

4. The computer-implemented method of claim 3, wherein the first requesting source further:
determines that the first local counter has a value of zero; and
terminates the second memory synchronization operation.

5. The computer-implemented method of claim 3, wherein the first requesting source further:
determines that the first local counter has a value equal to a reference count; and
terminates the second memory synchronization operation.

6. The computer-implemented method of claim 3, wherein the first requesting source further:
determines that the first local counter has a value equal to the value stored in a second local counter; and
terminates the second memory synchronization operation.

7. The computer-implemented method of claim 1, wherein transmitting the coalesced acknowledgement to the first requesting source comprises transmitting the coalesced acknowledgement via one or more crossbars.

8. The computer-implemented method of claim 1, wherein determining that the first requesting source has generated the second memory synchronization operation comprises receiving a notification message that includes a source identifier that identifies the first requesting source and the first group identifier that is based on a memory operation included in the first plurality of memory operations.

9. The computer-implemented method of claim 1, wherein the first requesting source includes at least one of a memory slice of a cache memory, a memory management unit, or a hub associated with a direct memory access engine.

10. The computer-implemented method of claim 1, wherein a destination of the second memory synchronization operation includes a hub that connects to a remote device via a communications network.

11. The computer-implemented method of claim 10, wherein the communications network includes at least one of a PCIe communications channel or an interprocessor communications channel.

12. The computer-implemented method of claim 1, wherein a tracking database is stored in a single acknowledgement tracking engine that tracks acknowledgements for a plurality of requesting sources including the first requesting source.

13. The computer-implemented method of claim 1, wherein a tracking database is stored in a plurality of acknowledgement tracking engines, and each acknowledgement tracking engines included in the plurality of acknowledgement tracking engines includes a replica of the tracking database.

14. The computer-implemented method of claim 1, wherein a tracking database is stored in a plurality of acknowledgement tracking engines, and each acknowledgement tracking engine included in the plurality of acknowledgement tracking engines includes a different portion of the tracking database.

15. The computer-implemented method of claim 14, wherein a first acknowledgement tracking engine included in the plurality of acknowledgement tracking engines communicates with each of the other acknowledgement tracking engines included in the plurality of acknowledgement tracking engines, and each acknowledgement tracking engine included in the plurality of acknowledgement tracking engines tracks acknowledgements for a different subset of requesting sources included in the plurality of requesting sources.

16. A system comprising: a first requesting source that: generates a first memory synchronization operation and a second memory synchronization operation; and an acknowledgement tracking engine coupled to the first requesting source that: receives a first plurality of acknowledgements responsive to a first plurality of memory operations generated subsequent to the first memory synchronization operation and prior to the second memory synchronization operation by the first requesting source included in a plurality of requesting sources, wherein the first memory synchronization operation and each memory operation included in the first plurality of memory operations are identified by a first group identifier, coalesces the first plurality of acknowledgements with a second plurality of acknowledgments responsive to a second plurality of memory operations generated subsequent to the first memory synchronization operation and prior to the second memory synchronization operation by the first requesting source into a coalesced acknowledgement, wherein each memory operation included in the second plurality of memory operations is identified by the first group identifier, subsequent to coalescing the first plurality of acknowledgements with the second plurality of acknowledgments, receiving the second memory synchronization operation corresponding to at least one of the first plurality of memory operations or the second plurality of memory operations, determines that a sum of the memory operations included in the first plurality of memory operations and the memory operations included in the second plurality of memory operations exceeds a threshold number for the first requesting source and the first group identifier, and responsive to determining that the sum of the memory operations included in the first plurality of memory operations and the memory operations included in the second plurality of memory operations exceeds the threshold number for the first requesting source and the first group identifier, transmits the coalesced acknowledgement to the first requesting source.

17. The system of claim 16, wherein the coalesced acknowledgement includes a count of the first plurality of acknowledgements.

18. The system of claim 17, wherein the first requesting source includes a local counter associated with the second memory synchronization operation, and wherein the first requesting source further decrements the local counter by the count of the first plurality of acknowledgements.

19. The system of claim 16, wherein, to determine that the first requesting source has generated the second memory synchronization operation, the acknowledgement tracking engine receives a notification message that includes a source identifier that identifies the first requesting source and the first group identifier that is based on a memory operation included in the first plurality of memory operations.

20. The system of claim 16, wherein the first requesting source includes at least one of a memory slice of a cache memory, a memory management unit, or a hub associated with a direct memory access engine.

* * * * *